US011631009B2

(12) United States Patent
Lin et al.

(10) Patent No.: US 11,631,009 B2
(45) Date of Patent: Apr. 18, 2023

(54) MULTI-HOP KNOWLEDGE GRAPH REASONING WITH REWARD SHAPING

(71) Applicant: salesforce.com, inc., San Francisco, CA (US)

(72) Inventors: Xi Victoria Lin, Menlo Park, CA (US); Caiming Xiong, Mountain View, CA (US); Richard Socher, Menlo Park, CA (US)

(73) Assignee: Salesforce.com, Inc, San Francisco, CA (US)

( * ) Notice: Subject to any disclaimer, the term of this patent is extended or adjusted under 35 U.S.C. 154(b) by 927 days.

(21) Appl. No.: 16/051,309

(22) Filed: Jul. 31, 2018

(65) Prior Publication Data

US 2019/0362246 A1 Nov. 28, 2019

Related U.S. Application Data

(60) Provisional application No. 62/675,170, filed on May 23, 2018.

(51) Int. Cl.
*G06N 20/00* (2019.01)
*G06N 5/04* (2023.01)
(Continued)

(52) U.S. Cl.
CPC ............. *G06N 5/04* (2013.01); *G06F 16/903* (2019.01); *G06F 16/9024* (2019.01);
(Continued)

(58) Field of Classification Search
None
See application file for complete search history.

(56) References Cited

U.S. PATENT DOCUMENTS 10,282,663 B2   5/2019  Socher et al.
2013/0185039 A1* 7/2013  Tesauro ................. G06N 20/00
                                                      703/6

(Continued)

FOREIGN PATENT DOCUMENTS

WO   2018/085728 A   5/2018

OTHER PUBLICATIONS

Policy invariance under reward transformations: Theory and application to reward shaping taken from http://citeseerx.ist.psu.edu/viewdoc/summary?doi=10.1.1.48.345 (Year: 1999).*

(Continued)

*Primary Examiner* — David R Vincent
(74) *Attorney, Agent, or Firm* — Haynes and Boone, LLP

(57) ABSTRACT

Approaches for multi-hop knowledge graph reasoning with reward shaping include a system and method of training a system to search relational paths in a knowledge graph. The method includes identifying, using an reasoning module, a plurality of first outgoing links from a current node in a knowledge graph, masking, using the reasoning module, one or more links from the plurality of first outgoing links to form a plurality of second outgoing links, rewarding the reasoning module with a reward of one when a node corresponding to an observed answer is reached, and rewarding the reasoning module with a reward identified by a reward shaping network when a node not corresponding to an observed answer is reached. In some embodiments, the reward shaping network is pre-trained.

20 Claims, 5 Drawing Sheets

(51) Int. Cl.
  G06N 3/04    (2023.01)
  G06N 3/08    (2023.01)
  G06F 16/903  (2019.01)
  G06F 16/901  (2019.01)
(52) U.S. Cl.
  CPC .......... *G06N 3/0472* (2013.01); *G06N 3/08* (2013.01); *G06N 20/00* (2019.01)

(56) References Cited

U.S. PATENT DOCUMENTS

| | | | |
|---|---|---|---|
| 2015/0286709 | A1* | 10/2015 | Sathish .............. G06N 7/005 706/52 |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0046616 | A1 | 2/2017 | Socher et al. |
| 2017/0140240 | A1 | 5/2017 | Socher et al. |
| 2018/0082171 | A1 | 3/2018 | Merity et al. |
| 2018/0096219 | A1 | 4/2018 | Socher |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0143966 | A1 | 5/2018 | Lu et al. |
| 2018/0144208 | A1 | 5/2018 | Lu et al. |
| 2018/0144248 | A1 | 5/2018 | Lu et al. |

OTHER PUBLICATIONS

Why Does Unsupervised Pre-training Help Deep Learning? taken from Why Does Unsupervised Pre-training Help Deep Learning? (Year: 2010).*

Simple statistical gradient-following algorithms for connectionist reinforcement learning taken from https://link.springer.com/article/10.1007/BF00992696 (Year: 1999).*

Deep Reward Shaping from Demonstrations (Hussein) taken from https://ieeexplore.ieee.org/stamp/stamp.jsp?tp=&arnumber=7965896&tag=1 (Year: 2017).*

Go for a Walk and Arrive at the Answer: Reasoning Over Paths in Knowledge Bases Using Reinforcement Learning taken from https://arxiv.org/abs/1711.05851v1 (Year: 2017).*

Dropout: A Simple Way to Prevent Neural Networks from Overfitting taken from https://jmlr.org/papers/v15/srivastava14a.html (Year :2014).*

Reward Shaping with Recurrent Neural Networks for Speeding up On-Line Policy Learning in Spoken Dialogue Systems taken from https://arxiv.org/pdf/1508.03391.pdf (Year: 2015).*

Convolutional 2D Knowledge Graph Embeddings taken from https://arxiv.org/abs/1707.01476v1 (Year: 2017).*

Complex Embeddings for Simple Link Prediction (Trouillon) taken from file:///C:/Cases/16051309%20-%20salesforce%20knowledge%20graph/SimpleLinkPrediction.pdf (Year: 2016).*

Lu Chen et al: "Agent-Aware Dropout DQN 1-20 for Safe and Efficient On-line Dialogue Policy Learning", Sep. 1, 2017.

Wenhan Xiong et al: "DeepPath: A Reinforcement Learning Method for Knowledge Graph Reasoning", Jul. 20, 2017.

Zhenghao Liu et al: "Entity-Duet Neural Ranking: Understanding the Role of Knowledge Graph Semantics in Neural Information Retrieval", Arxiv.org, Cornell University Library, 201 0lin Library Cornell University Ithaca, NY 14853, May 19, 2018 (May 19, 2018), XP080880111, p. 9, right-hand column, paragraph 2 May 19, 2018.

Mchen Gong et al: "Ruminating Reader: Reasoning with Gated Multi-Hop Attention", Apr. 24, 2017 (Apr. 24, 2017), XP055542416, Retrieved from the Internet: URL: https://arxiv.org/pdf/1704.07415.pdf [retrieved on Jul. 23, 2019], p. 1-p. 8, right-hand column, paragraph 3 Apr. 24, 2017.

Jun Yin et al: "Neural Generative Question Answering", Proceedings of the Workshop on Human-computer Question Answering, Apr. 22, 2016 (Apr. 22, 2016), pp. 36-42, XP055404542, Apr. 22, 2016.

Xi Victoria Lin et al: Knowledge Graph Reasoning with Reward Shaping, Arxiv.org, Cornell University Library, 201 Olin Library Cornell University Ithaca, NY 14853, Aug. 31, 2018 (Aug. 31, 2018), XP081102901, the whole document Aug. 31, 2018.

Rajarshi Das et al.: "Go for a Walk and Arrive at the Answer: Reasoning Over Paths in Knowledge Bases using Reinforcement Learning", Arxiv.org, Cornell University Library, 201 Olin Library Cornell University Ithaca, NY 14853, Nov. 16, 2017 (Nov. 16, 2017), XP080837625, p. 1-p. 10, p. 14-p. 15.

International Search Report and Written Opinion dated Jul. 31, 2019 issued in related PCT Application No. PCT/US2019/032595 (16 pages).

Berant et al., "Semantic Parsing on Freebase from Question-Answer Pairs," In Proceedings of the 2013 Conference on Empirical Methods in Natural Language Processing. Seattle, Washington, USA, Oct. 18-21, 2013, pp. 1533-1544.

Bordes et al., "Translating embeddings for modeling multi-relational data," In Proceedings of the 26th Annual International Conference on Neural Information Processing Systems—vol. 2, Dec. 5-10, 2013, 9 pages.

Chen et al., "Variational Knowledge Graph Reasoning," ArXiv:1803.06581, Oct. 23, 2018, 10 pages.

Das et al., "Go For a Walk and Arrive at the Answer: Reasoning Over Paths in Knowledge Bases Using Reinforcement learning," In International Conference on Learning Representations, Vancouver, Canada, Apr. 30-May 3, 2018, 18 pages.

Dettmers et al., "Convolutional 2D Knowledge Graph Embeddings," In proceedings of the Thirty-Second AAAI Conference on Artificial Intelligence, New Orleans, Louisiana, USA, Feb. 2-7, 2018, pp. 1811-1818.

Gardner et al., "Improving Learning and Inference in a Large Knowledge-Base Using Latent Syntactic Cues," Seattle, Washington, USA, Oct. 18-21, 2013, pp. 833-838.

Guu et al., "Traverse Knowledge Graphs in Vector Space," In Proceedings of the 2015 Conference on Empirical Methods in Natural Language Processing, Lisbon, Portugal, Sep. 17-21, 2015, pp. 318-327.

Guu et al., "From Language to Programs: Bridging Reinforcement Learning and Maximum Marginal Likelihood," In Proceedings of the 55th Annual Meeting of the Association for Computational Linguistics, Vancouver, Canada, Jul. 30-Aug. 4, 2017, pp. 1051-1062.

He et al., "Learning Symmetric Collaborative Dialogue Agents with Dynamic Knowledge Graph Embeddings," In Proceedings of the 55th Annual Meeting of the Association for Computational Linguistics, Vancouver, Canada, Jul. 30-Aug. 4, 2017, pp. 1766-1776.

Kok et al., "Statistical Predicate Invention," In Proceedings of the 24th International Conference on Machine Learning. Corvalis, Oregon, USA, Jun. 20-24, 2007, pp. 433-440.

Lao et al., "Random Walk Inference and Learning in a Large Scale Knowledge Base," In Proceedings of the Conference on Empirical Methods in Natural Language Processing, Edinburgh, United Kingdom, Jul. 27-31, 2011, 11 pages.

Lao et al., "Reading the Web with Learned Syntactic-Semantic Inference Rules," In Proceedings of the 2012 Joint Conference on Empirical Methods in Natural Language Processing and Computational Natural Language Learning, Jeju Island, Korea, Jul. 12-14, 2012, pp. 1017-1026.

McCallum et al., "Chains of Reasoning Over Entities, Relations, and Text Using Recurrent Neural Networks," In Proceedings of the 15th Conference of the European Chapter of the association for Computational Linguistics, Valencia, Spain, Apr. 3-7, 2017, pp. 132-141.

Mnih et al., "Playing Atari with Deep Reinforcement Learning," Nips Deep Learning Workshop, ArXiv:1312.5602, 2013, 9 pages.

Page et al., "The Page Rank Citation Ranking: Bringing Order to the Web," Technical Report Stanford InfoLab, Previous number = SIDL-WP-1990-0120, Jan. 29, 1998, 17 pages.

(56) References Cited

OTHER PUBLICATIONS

Paulus et al., "A Deep Reinforced Model for Abstractive Summarization," ArXiv:1705.04304, Nov. 13, 2017, 12 pages.
Ranzato et al., "Sequence Level Training with Recurrent Neural Networks," ArXiv:1511.06732, May 6, 2016, 16 pages.
Rocktaschel et al., "End-to-End Differentiable Proving," In Proceedings of the 2017 Advances in Neural Information Processing Systems 30, Annual Conference on Neural Information Processing Systems, Long Beach, CA, USA, Dec. 4-9, 2017, pp. 3791-3803.
Shen et al., "M-Walk: Learning to Walk in Graph with Monte Carlo Tree Search," ArXiv:1802.04394, Nov. 1, 2018, 17 pages.
Socher et al., "Reasoning with Neural Tensor Networks for Knowledge Base Completion," In Proceedings of the 26th International Conference on Neural Information Processing Systems, Lake Tahoe, Nevada, USA, Dec. 5-10, 2013, 10 pages.
Toutanova "Representing Text for jJoint Embedding of Text and Knowledge Bases," In Proceedings of the 2015 Conference on Empirical Methods in Natural Language Processing, Lisbon, Portugal, Sep. 17-21, 2015, pp. 1499-1509.
Trouillon et al., "Complex Embeddings for Simple Link Prediction," In Proceedings of the 33rd International Conference on Machine Learning, vol. 48 of JMLR Workshop and Conference Proceedings, New York City, NY, USA, Jun. 19-24, 2016, 10 pages.
Williams, Ronald J. "Simple Statistical Gradient Following Algorithms for Connectionist Reinforcement Learning," Machine Learning 8, Issue 3-4, 1992, pp. 229-256.
Xiong, et al., "DeepPath: A Reinforcement Learning Method for Knowledge Graph Reasoning," In Proceedings of the 2017 Conference on Empirical Methods in Natural Language Processing, Copenhagen, Denmark, Sep. 9-11, 2017, pp. 564-573.
Yang et al., Embedding Entities and Relations for Learning and Inference in Knowledge Bases, ArXiv:1412.6575, Aug. 29, 2015, 12 pages.
Yang et al., "Differentiable Learning of Logical Rules for Knowledge Base Reasoning," In 2017 Advances in Neural Information Processing Systems 30, Annual Conference on Neural Information Processing Systems, Long Beach, CA, USA, Dec. 4-9, 2017, pp. 2316-2325.

* cited by examiner

| Model | UMLS | | Kinship | | | FB15k-237 | | | WN18RR | | | NELL-995 | | |
|---|---|---|---|---|---|---|---|---|---|---|---|---|---|---|
| | @1 | @10 | MRR | @1 | @10 | MRR | @1 | @10 | MRR | @1 | @10 | MRR | @1 | @10 | MRR |
| DistMult | 82.1 | 96.7 | 86.8 | 48.7 | 90.4 | 61.4 | 32.4 | 60.0 | 41.7 | 43.1 | 52.4 | 46.2 | 55.2 | 78.3 | 64.1 |
| ComplEx | 89.0 | 99.2 | 93.4 | 81.8 | 98.1 | 88.4 | 32.8 | 61.6 | 42.5 | 41.8 | 48.0 | 43.7 | 64.3 | 86.0 | 72.6 |
| ConvE | 93.2 | 99.4 | 95.7 | 79.7 | 98.1 | 87.1 | 34.1 | 62.2 | 43.5 | 41.3 | 51.0 | 44.5 | 67.8 | 88.6 | 76.1 |
| NeuralLP | 64.3 | 96.2 | 77.8 | 47.5 | 91.2 | 61.9 | 16.6 | 34.8 | 22.7 | 37.6 | 65.7 | 46.3 | — | — | — |
| NTP-λ | 84.3 | 100 | 91.2 | 75.9 | 87.8 | 79.3 | — | — | — | — | — | — | — | — | — |
| MINERVA | 72.8 | 96.8 | 82.5 | 60.5 | 92.4 | 72.0 | 21.7 | 45.6 | 29.3 | 41.3 | 51.3 | 44.8 | 66.3 | 83.1 | 72.5 |
| Ours(ComplEx) | 88.7 | 98.5 | 92.9 | 81.1 | 98.2 | 87.8 | 32.9 | 54.4 | 39.3 | 43.7 | 54.2 | 47.2 | 65.5 | 83.6 | 72.2 |
| Ours(ConvE) | 91.5 | 99.1 | 94.9 | 78.9 | 98.2 | 86.5 | 32.7 | 56.4 | 40.7 | 42.5 | 53.0 | 46.0 | 65.4 | 83.6 | 72.2 |

*FIG. 5*

MULTI-HOP KNOWLEDGE GRAPH REASONING WITH REWARD SHAPING

PRIORITY APPLICATION DATA

This application claims priority to Application No. 62/675,170 filed on May 23, 2018, which is incorporated by reference in its entirety.

TECHNICAL FIELD

The present disclosure relates generally to knowledge graph reasoning and more specifically to multi-hop knowledge graph reasons with reward shaping and active drop-out.

BACKGROUND

Query answering (QA) over knowledge graphs (KGs) supports many natural language processing (NLP) applications, such as semantic search, dialogue response generation, and/or the like. Reasoning over multi-hop relational paths is a competitive approach for query answering over incomplete knowledge graphs, with the benefit of being trivially interpretable.

Accordingly, it would be advantageous to have improved systems and methods for performing multi-hop knowledge graph reasoning.

BRIEF DESCRIPTION OF THE DRAWINGS

FIG. 5 is a table illustrating question answering performance on different knowledge graphs using different models, according to some embodiments.

In the figures, elements having the same designations have the same or similar functions.

DETAILED DESCRIPTION

Context specific reasoning, including context specific reasoning regarding the content of natural language information, is an important problem in machine intelligence and learning applications. Context specific reasoning may provide valuable information for use in the interpretation of natural language text and can include different tasks, such as answering questions about the content of natural language text, language translation, semantic context analysis, and/or the like. However, each of these different types of natural language processing tasks often involve different types of analysis and/or different types of expected responses.

The ability to perform multi-hop reasoning is important to knowledge graph based query answering in the following aspects: (1) inferring missing or new relational links by synthesizing information over the paths connecting a pair of entities, e.g., bornIn(Obama, Hi.)/\located-in(Hawaii, US)=>bornIn(Obama, US) and (2) answering queries that are essentially multi-hop, e.g., "Which character does Benedict Cumberbatch play in Avengers?" Besides their competitive performance, multi-hop reasoning approaches can output human-readable answer sets which may make their results easy to interpret.

According to some embodiments, multi-hop reasoning may be formulated as a sequential decision problem, and leveraged deep reinforcement learning (DRL) to perform efficient search over large knowledge graphs. However, for an incomplete knowledge graph environment, a reasoning module receives low-quality reward corrupted by the false negatives, which harms its generalization at test time. Furthermore, because no golden action sequence is used for training, the reasoning module can be easily misled by non-logical search trajectories that leads to the correct results and stuck in the local minima.

According to some embodiments, non-logical search trajectories and local minima may be avoided by adopting a pre-trained one-hop embedding model to estimate the reward of unobserved facts.

According to some embodiments, non-logical search trajectories and local minima may be avoided by performing an action dropout which randomly masks some edges of a node in the knowledge graph during training, so as to enforce effective exploration of a diverse set of path types.

Figure 1:
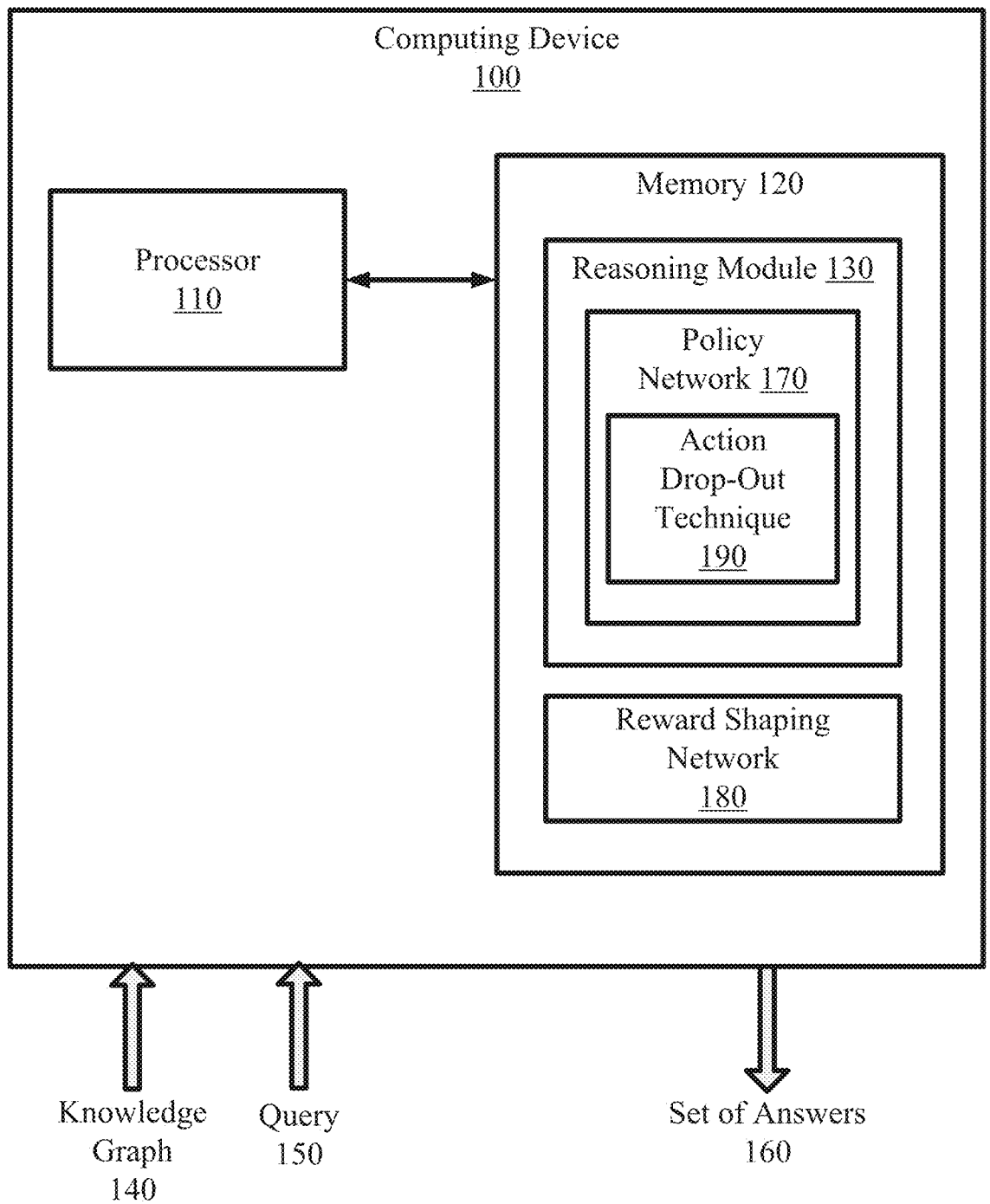
FIG. 1 is a simplified diagram of a computing device, according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The tangible, machine readable media that include executable code that when run by one or more processors (e.g., processor 110) may cause the one or more processors to perform the processes of the methods and/or implement and/or emulate the models and systems described herein.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a reasoning module 130 that may be used to traverse the knowledge graph reasoning systems and models described further herein and/or to implement any of the methods described further herein. In some examples, reasoning module 130 may be used to answer a query 150 by traversing knowledge graph 140 or a model of knowledge graph 140. In some examples, reasoning module 130 may also handle the iterative training and/or evaluation of a system or model used for knowledge graph reasoning. As shown, computing device 100 receives knowledge graph 140 and query 150, which are provided to reasoning module 130, reasoning module 130 then generates a set of answers 160 that may answer query 150 based on knowledge graph 140.

Figure 2:
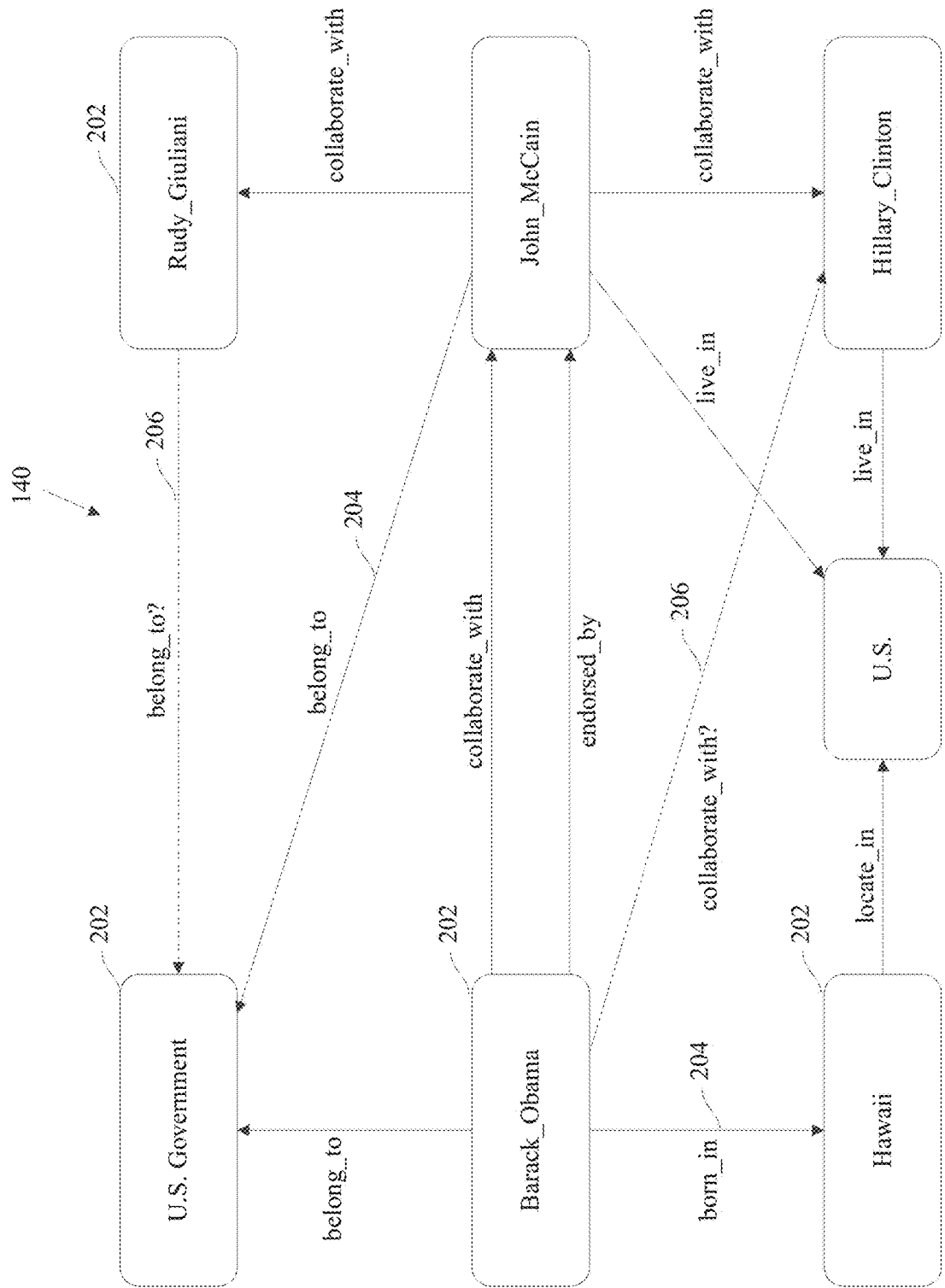
FIG. 2 is a block diagram of an incomplete knowledge graph, according to some embodiments.

As illustrated in FIG. 1, computing device 100 receives a knowledge graph or simply graph 140. A graph 140 includes nodes that store entries and that are connected by edges or links that show relationships between the entries. FIG. 2 is an example knowledge graph, according to some embodiments. As illustrated in FIG. 2, knowledge graph includes example nodes 202 that include entities. Example entities may be "Barack_Obama," "John_McCain," "U.S. Government," "Hawaii," etc. An entity may be a starting point for a search of set of answers 160 for query 150. Also one or more entities may include set of answers 160 to query 150.

In some embodiments, nodes 202 in graph 140 may be connected using directed edges or links 204. Links 204 and edges are used interchangeably throughout the specification. The edges or links 204 are directed from one node 202 to another node 202 and may show a relationship between two or more entities included in nodes 202. For example, node 202 that includes entity "John_McCain" has link 204 that is a relationship "belong_to" with node 202 that includes entity "U.S. Government." In another example, node 202 that includes entity "Barack_Obama" has link 204 that is a relationship "belong_to" with node 202 that includes entity "U.S. Government." As also illustrated node 202 that includes entity "Barack_Obama" has link 204 that is a relationship "born_in" to node 202 that includes entity "Hawaii".

Going back to FIG. 1, in some embodiments, graph 140 may be represented as G=(ε, R), where ε is a set of entities and R is a set of relations. Graph 140 and G are referred interchangeably throughout the specification. The set of entities ε may be entities in nodes 202 in graph 140. There may be one entity per node 202 in some embodiments. The set of relations R may indicate a relationship between two or more nodes 202. For example, a pair of nodes 202 may have one or more relationships. Typically, set of relations R may be included in links 204. In some embodiments, link 204 between nodes 202 in graph 140 may be represented as $l=(e_s, r, e_o) \in G$.

In some embodiments, graph 140 may be an incomplete graph. The incomplete graph may be graph 140 that contains missing links between two or more nodes 202 even though there exists a relationship between the entities in these two or more nodes 202. In FIG. 2, missing links 206 are links 206, illustrated with dashed arrows. Example missing link 206 may be a relationship "belong_to" from node 202 that includes entity "Rudy_Giuliani" to node 202 that includes entity "U.S. Government." Another example missing link 206 may be a relationship "collaborate_with" from node 202 that includes entity "Barack_Obama" to node 202 that includes entity "Hillary_Clinton."

Going back to FIG. 1, as discussed above, reasoning module 130 may traverse graph 140 to generate set of answers 160 to query 150. Query 150 may be a question received by computing device 100 from a user or generated by one or more applications that require an answer to a question. In some embodiments, query 150 may be represented as $(e_s, r_q, ?)$, where $e_s$ is a source entity and r is a relation of interest. In other words, $e_s$ may be node 202 from which reasoning module 130 begins to search for set of answers 160 over graph 140 and r may be link 204 that may lead to set of answers 160.

In some embodiments, once computing device 100 receives query 150 and graph 140, reasoning module 130 may perform a search over graph 140 to identify set of answers 160 for query 150. Set of answers 160 may be defined as $E_o = \{e_o\}$, and may include one or more nodes 202 that include entities that are answers to query 150. As discussed above, graph 140 may be an incomplete knowledge graph. In this case, the embodiments below describe how reasoning module 130 performs an efficient search of graph 140 and identifies set of answers 160 defined as $E_o = \{e_o\}$ for where $(e_s, r_q, e_o) \notin G$.

In some embodiments, reasoning module 130 may use a reinforcement learning technique to identify set of answers 160 for query 150 when graph 140 is an incomplete graph. Reinforcement learning technique is a machine learning technique where reasoning module 130 may take actions in a search over graph 140 that may maximize some reward. In some embodiments, the reinforcement learning technique may be a Markov Decision Process, which is known in the art. In the Markov Decision Process, reasoning module 130 may begin the search for query 150 at node 202 that includes entity $e_s$, and the sequentially select outgoing edges (links 204) and traverse to a connected node 202 that includes another entity e until reasoning module 130 arrives at a target entity $e_t$. In some embodiments, the Markov Decision Process may include components such as states, actions, and transitions, which are described below.

In some embodiments, S may be a set of possible states in graph 140, where each state $s_t$ may be defined as $s_t = (e_t, (e_s, r_q)) \in S$. In this case, each state $s_t$ may be a tuple where $e_t$ included in node 202 is an entity visited at step t, and $(e_s, r_q)$ is the source entity $(e_s)$ and query relation $(r_q)$. In some embodiments, $e_t$ may be viewed as state-dependent information while $(e_s, r_q)$ may be viewed as a global context that is shared by all states.

In some embodiments, A may be a set of possible actions that may occur at outgoing edges (links 204) of an entity included at node 202 at step t. For example, a set of possible actions $A_t \in A$ at step t may consist of the outgoing edges (links 204) of $e_t$ (node 202) in G (graph 140). In some embodiments, a set of actions $A_t$ may be represented as $A_t = \{(r', e')|(e_t, r', e') \in G\}$. To terminate a search, the set of action $A_t$ may include a self-loop edge that starts and ends at the same node 202 that has the same entity $e_t$. Accordingly, when reasoning module 130 encounters a self-loop edge, reasoning module 130 may terminate the search for set of answers 160.

In some embodiments, δ is a transition function. Example transition function may be δ: S×A→S and may be defined as $\delta(s_t, A_t) = \delta(e_t, (e_s, r_q) A_t)$. In some embodiments, reasoning module 130 may determine the transition function δ is based on G.

In some embodiments, reasoning module 130 may receive a reward. Conventionally, the reward may have a value of 1 if reasoning module 130 arrives at a correct target entity $e_T$ (entity that is an answer to query 150) when reasoning module 130 traverses graph 140. Otherwise, when reasoning module 130 does not arrive at a correct target entity $e_T$ when reasoning module 130 traverses graph 140, the reward may have a value of 0. In some embodiments, the reward may be defined as:

$$R_b(s_T) = 1\{(e_s, r_q, e_T) \in G\} \quad \text{(Equation 1)}$$

In some embodiments, reasoning module 130 may access or generate a policy network 170 to search graph 140 for set of answers 160 to query 150. Policy network 170 may be stored in memory 120 or within reasoning module 130. In some embodiments, policy network 170 may be implemented as a neural network. In some embodiments, policy network 170 may be parameterized using state information, global context, and search history.

In some embodiments, the state information and global context includes every entity and relation in G. For example, each entity e in G may be assigned a dense vector embedding $e \in \mathbb{R}^d$, and each relation r may be assigned a dense vector embedding $r \in \mathbb{R}^d$. In some embodiments, an action $a_t = (r_{t+i}, e_{t+1}) \in A_t$ in policy network 170 may be represented as $a_t = [r; e_t']$, which is a concatenation of the relation dense vector embeddings r and the end node entity dense vector embeddings $e_t'$.

In some embodiments, the search history may include a history of previous searches that reasoning module 130 performed on graph 140. For example, search history $h_t = (e_s, r_1, \ldots e_t) \in H$ may consist of a sequence of observations and actions that were taken at step t in previous searches. In some embodiments, the search history may be encoded using a long short-term memory ("LSTM") units in policy network 170. Example LSTM units may be:

$$h_0 = \text{LSTM}(0, [r_0; e_s]) \quad \text{(Equation 2)}$$

$$h_t = \text{LSTM}(h_t, a_t, t > 0) \quad \text{(Equation 3)}$$

where $r_0$ may be a special start relation introduced to a start action with the start entity $e_s$.

In some embodiments, an action space may be encoded by stacking embeddings of some or all actions in $A_t$: $A_t \in \mathbb{R}^{|A_t| \times d}$. Using the action space, policy network 170 (referred to as policy network π) may be defined as:

$$\pi_\theta(a_t|s_t) = \sigma(A_t \times W_2 \text{ReLU}(W_1[e_t; h_t; r_q])) \quad \text{(Equation 4)}$$

where σ is a softmax operator. A softmax operator may be included in a last layer of a neural network and may generate a probability distribution of a number of different outcomes. The ReLU may be a rectified linear unit of neural network. As policy network 170 is a neural network, $W_1$ and $W_2$ are trainable weight matrices for the respective layers of neural network.

Accordingly, when reasoning module 130 traverses policy network 170 as represented above, reasoning module 130 may identify set of answers 160 to query 150.

In some embodiments, prior to using policy network 170 to identify expected set of answers 160 to query 150, policy network 170 may initially be trained. During training, set of answers 160 for each query 150 is known. Accordingly, policy network 170 is trained to maximize an expected reward over some or all queries 150 in G using the following equation:

$$J(\theta) = \mathbb{E}_{(e_s, r_q, e_o) \in G}[\mathbb{E}_{a_1, \ldots a_T \sim \pi_\theta}[R(s_T|e_s, r)]] \quad \text{(Equation 5)}$$

In some embodiments, the training strategy in Equation 5 may treat query 150 with set of answers where n>1 (n being an integer), as "n" single answer queries. In other words, each query 150 may have multiple sets of answers 160 and each set of answers 160 may include single answer.

In some embodiments, training of policy network 170 may be optimized using a REINFORCE algorithm. The REINFORCE algorithm may iterate through all $(e_s, r_q, e_t)$ triplets in G and update θ with the following stochastic gradient:

$$\nabla_\theta J(\theta) \approx \nabla_\theta \Sigma_t R(S_T|e_s, r) \log \pi_\theta(a_t|s_t) \quad \text{(Equation 6)}$$

As discussed above, a reinforcement learning technique may award a conventional binary reward to reasoning module 130, shown in Equation 1. However, because graph 140 may be an incomplete graph, the binary reward approach may reward false negatives and true negatives. To reduce a reward for false negatives and true negatives, the reinforcement learning technique may use one-hop knowledge graph embedding model designed for completing the incomplete knowledge graphs and generating a soft reward for target entities whose correctness is known. The reinforcement learning technique may then award reasoning module 130 with a reward generated by the one-hop knowledge graph embedding model. In some embodiments, the one-hop knowledge graph embedding model may be reward shaping network 180, described below. Reward shaping network 180 may be a neural network and may be stored in memory 120, in some embodiments.

In some embodiments, reward shaping network 180 may map nodes 202 modeled as a set of entities E, and links 204 modeled as a set of relations R to a vector space. Reward shaping network 180 may then estimate the likelihood of each link $l = (e_s, r, e_t) \in G$ using a composition function $f(e_s, r, e_t)$ over the entity and relation embeddings. In some embodiments, function $f$ may be trained by maximizing the likelihood of all facts in G. Once function $f$ is trained, reinforced learning technique may use the following reward function to generate a reward to reasoning module 130:

$$R(s_T) = R_b(s_T) + (1 - R_b(s_T))f(e_s, r_q, e_T) \quad \text{(Equation 7)}$$

As illustrated in Equation 7, as reasoning module 130 traverses policy network 170 for set of answers 160 to query 150, reasoning module 130 may receive a reward of 1 if reasoning module 130 generates destination $e_T$ that is a correct answer to query 150. Otherwise, reasoning module 130 may receive a fact store that may be estimated by function $f(e_s, r_q, e_T)$, which is pre-trained.

As discussed above, policy network 170 be trained using a REINFORCE algorithm. The REINFORCE algorithm may perform on-policy sampling according to $\pi_\theta(a_t|s_t)$ and update θ stochastically using Equation 6. In some embodiments, because reasoning module 130 does not have access to an oracle path, reasoning module 130 may arrive at a correct answer $e_o$ in set of answers 160 via a path that is barely relevant to query 150. For example, as illustrated in FIG. 1, the path "Obama-endorsedBy→McCain-liveIn→U.S.←locatedIn-Hawaii" cannot be used to infer that "bornIn(Obama,Hi.)".

In some embodiments, reasoning module 130 may incorporate an action drop-out technique 190 into policy network 170. Action drop-out technique 190 may eliminate or reduce traversal of non-relevant or barely relevant paths. In some embodiments, action drop-out technique 190 may randomly mask some outgoing edges of node 202 in graph 140 in the sampling step of the REINFORCE algorithm. Once the outgoing edges are masked, reasoning module 130 may traverse the remaining on unmasked outgoing edges from node 202. In some embodiments, reasoning module may perform sampling according to the adjusted action distribution:

$$\pi_\theta^-(a_t|s_t) = \sigma(\pi_\theta(a_t|s_t) \cdot m + \in) \quad \text{(Equation 8)}$$

$$m_i \sim \text{Bernoulli}(1 - \alpha), i = 1, \ldots, |A_t| \quad \text{(Equation 9)}$$

where each entry of $m \in \{0, 1\}^{|A_t|}$ is a binary variable sampled from the Bernoulli distribution with parameter 1-α, where α is a random number between zero and 1. Further, a small value E may be used to smooth the distribution in case m=0, where $\pi_\theta^\sim (a_t|s_t)$ becomes uniform.

With reference to FIG. 2, suppose reasoning module 130 begins to traverse node 202 with an entity "Barack_Obama" to determine "bornIn(Obama,Hi.)". When action drop-out technique 190 is used, action drop-out technique 190 may mask links "collaborate_with" and "endorsed_by" from node 202. Once masked, reasoning module 130 may perform sampling on the remaining links 204 that include "born_in" and "belong_to."

Figure 3:
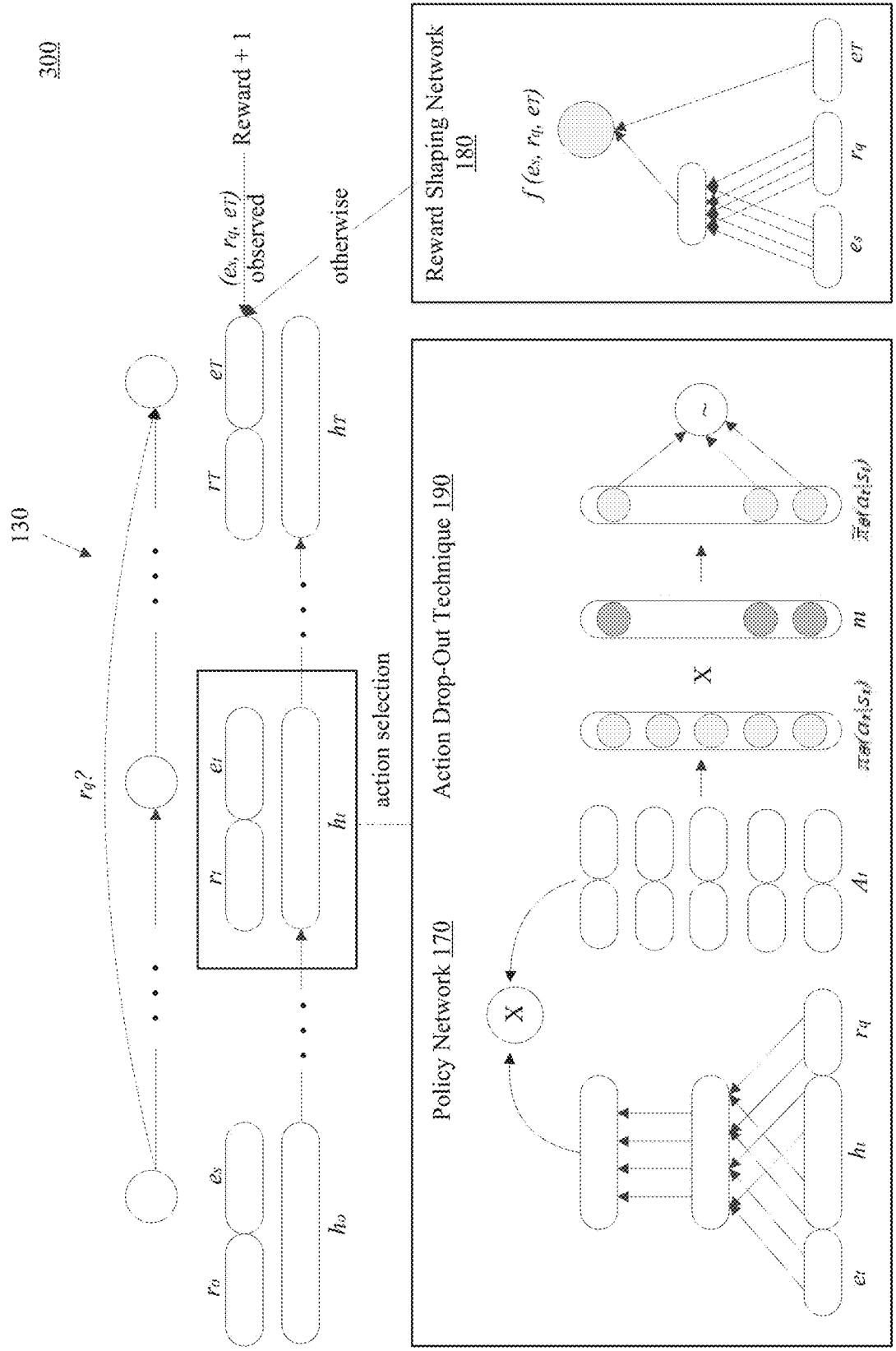
FIG. 3 is a block diagram of a training approach for a policy network, according to some embodiments.

In some embodiments, once reasoning module 130 is trained, reasoning module 130 may traverse policy network 170 and identify set of answers 160 to query 150 received by computing device 100. After training, policy network 170 may not use reward sharing network 180 to determine a reward for reasoning module 130. Also, after training, policy network 170 may not use action drop-out technique 190 to mask edges (links 204) in graph 140. Instead, after training, reasoning module 130 may traverse across some or all (links 204) edges from nodes 202 that are in the path to set of answers 160.

is trained using reward sharing network 180 and action drop-out technique 190, policy network 170 may be used to determine set of answers 160 from query 150 as illustrated in equation 4. As FIG. 3 is a block diagram 300 of a training approach for a policy network, according to some embodiments. As illustrated in FIG. 3, policy network 170 may be trained with action drop-out technique 190 and reward shaping network 180. As illustrated in FIG. 3, at each step t, reasoning module 130 samples an outgoing link (r', $e_t'$) according to $\pi_\theta^\sim (a_t|s_t)$, which is a stochastic REINFORCE policy ($\pi_\theta(a_t|s_t)$) that is perturbed by a random mask m. As also illustrated in FIG. 3, reasoning module 130 receives a reward of 1 if reasoning module 130 observes a correct answer in set of answers 160. Otherwise, reasoning module 130 receives a reward $f$ ($e_s$, $r_q$, $e_T$) that is estimated by reward shaping network 180.

Figure 4:
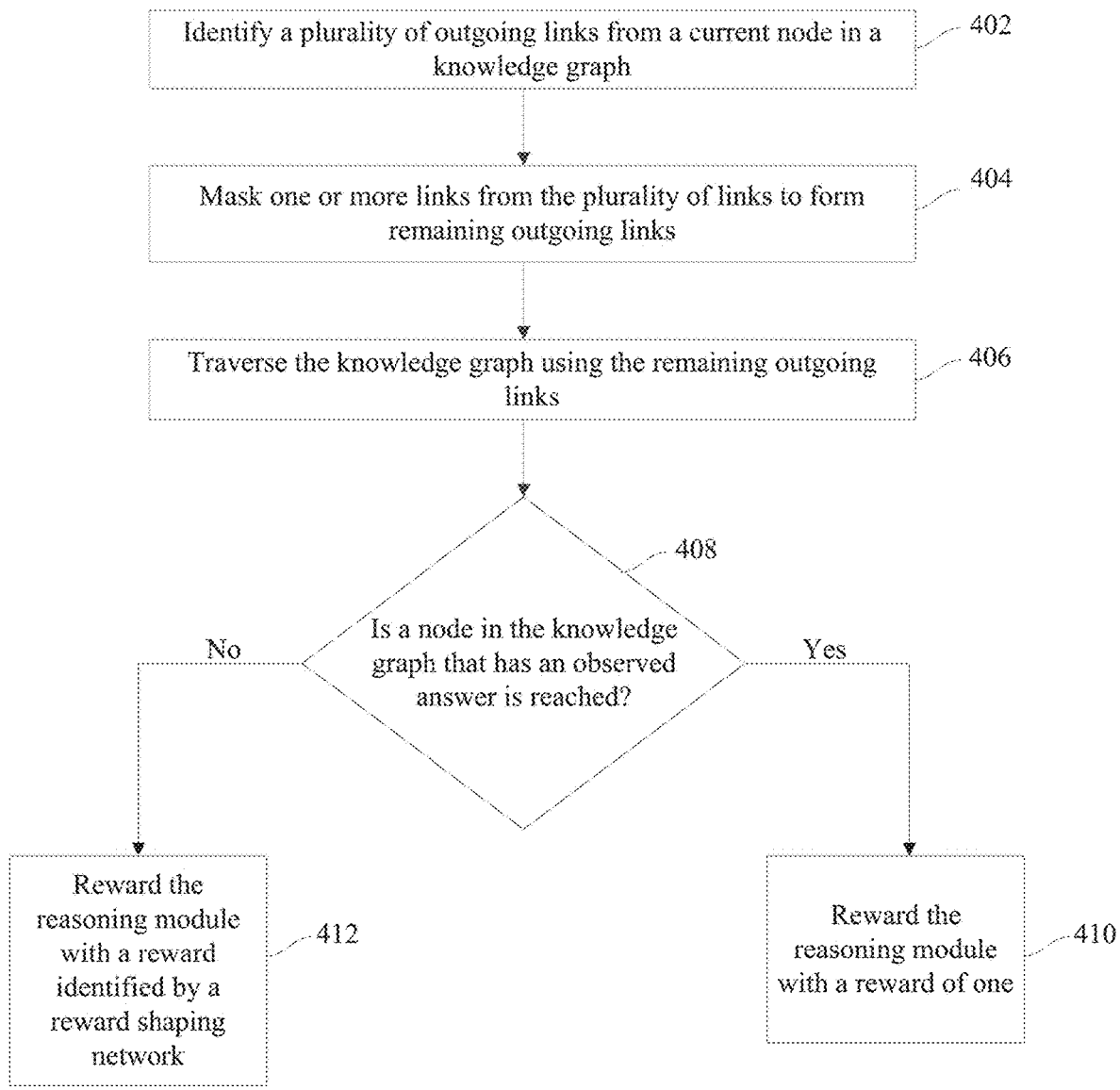
FIG. 4 is a flowchart of a method for training a policy network, according to some embodiments.

FIG. 4 is a simplified diagram of a method 400 for training a policy network, according to some embodiments. One or more of the operations 402-412 of method 400 may be implemented, at least in part, in the form of executable code stored on non-transitory, tangible, machine-readable media that when run by one or more processors may cause the one or more processors to perform one or more of the operations 402-412.

At operation 402, a node is identified. For example, reasoning module 130 identifies node 202 that may be a start node to query 150 or one of the nodes in graph 140 along a path to set of answers 160.

At operation 404, one or more links are removed from the identified node. For example, action drop-out technique 190 may be used to mask one or more links 204 from the identified node 202 to other nodes 202, forming the remaining outgoing links 240 for the identified node 202.

At operation 406, a graph is traversed using the remaining outgoing nodes. For example, reasoning module 130 may use the remaining outgoing links 204 and policy network 170 to traverse the remaining outgoing links to determine set of answer 160 for query 150.

At operation 408, a determination is made whether a node with an observed answer is reached. For example, during training, query 150 may be associated with set of answers 160. If reasoning module 130 reaches node 202 that includes an entity that corresponds to an answer in set of answers 160, then reasoning module 130 reaches an observed answer. If reasoning module 130 reaches the observed answer, method 400 proceeds to operation 410. Otherwise, method 400 proceeds to operation 412.

At operation 410, rewarding the reasoning module with a reward of one.

At operation 412, rewarding the reasoning module with a reward identified by a reward shaping network. For example, reward shaping network 180 may identify a reward and award the identified reward to reasoning module 130.

In some embodiments, awarding a reward to reasoning module 130 using reward shaping network 180 and using action drop out technique 190 while training policy network 170 increases query answering performance over graph 140. This is illustrated in FIG. 5 that includes a table illustrating question answering performances on different knowledge graphs using different models. Example datasets represented as knowledge graphs in FIG. 5 are UMLS, Kinship, FB15k-237, WN18RR, and NELL-995. FIG. 5 also illustrated different models used to find an answer or set of answers 160 to query 150 using the above knowledge graphs. Example single-hop modes are Dist-Mult, ComplEx, ConvE, and example multi-hop models are NTP-λ, (which is an improved version of Neural Theorem Prover), Neural Logical Programming (NeuralLP), and MINERVA. Additionally, ComplEx and ConvE have been modified to include reward shaping network 180 and action drop-out technique 190 described above.

As illustrated in FIG. 5, ComplEx and ConvE that have been modified to include reward shaping network 180 and action drop-out technique 190 appear to have an increase performance for identifying an answer for query 150 across many of the UMLS, Kinship, FB15k-237, WN18RR, and NELL-995 graphs as compared to other models.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
    training, using a processor, a policy network to search relational paths in a knowledge graph, wherein the training includes:
        traversing, using a processor, nodes of the knowledge graph over a plurality of time steps;
        identifying, at a current time step in the plurality of time steps and using a reasoning module, a plurality of first outgoing links from a current node in the knowledge graph;
        masking, using the reasoning module and at the current time step in the plurality of time steps, a subset of links from the plurality of first outgoing links of the current node to form a plurality of second outgoing links to a subset of nodes adjacent to the current node;
        traversing the knowledge graph using the plurality of second outgoing links;
        rewarding the reasoning module with a reward of one when a node in the subset of nodes corresponds to an observed answer is reached; or
        rewarding the reasoning module with the reward identified by a reward shaping network when a node not corresponding to the observed answer is reached, wherein the reward shaping network is a pre-trained neural network that generates the reward having a value in values only between zero and one, wherein the value indicates a likelihood that the observed answer is reachable from the node; and traversing from the current node to a next node at a next step in the plurality of time steps.

2. The method of claim 1, wherein the reward is generated using a function:

$$R(s_T)=R_b(s_T)+(1-R_b(s_T))f(e_s,r_q,e_T)$$

wherein $s_T$ is a state at a target entity of a third node in the knowledge graph, $e_s$ is a start entity of the current node, $r_q$ is a relation of a query received by the policy network, $e_T$ is a target entity of the node corresponding to the observed answer, function $f$ is a composition function over entities in the knowledge graph, and $R_b(S_T)$ is a function determining a reward value.

3. The method of claim 1, wherein the masking is based on a Bernoulli distribution.

4. The method of claim 1, wherein the policy network uses a REINFORCE algorithm.

5. The method of claim 1, further comprising:
receiving a query; and
generating, using the reasoning module and the policy network, the observed answer in response to the query.

6. The method of claim 1, wherein the knowledge graph is an incomplete knowledge graph.

7. The method of claim 1, further comprising:
after training the policy network, using the policy network to generate a set of answers in response to receiving a second query.

8. A system comprising:
a memory;
a processor coupled to the memory and configured to train a policy network to search relational paths in a knowledge graph, wherein the training includes:
traverse traversing nodes of the knowledge graph over a plurality of time steps;
identify identifying, at a current time step in the plurality of time steps and using a reasoning module, a plurality of first outgoing links from a current node in the knowledge graph to nodes adjacent to the current node;
mask masking, at the current time step in the plurality of time steps, a subset of links from the plurality of first outgoing links of the current node to form a plurality of second outgoing links using a mask, the plurality of second outgoing links from the current node to a subset of the nodes adjacent to the current node;
traverse traversing the knowledge graph using the plurality of second outgoing links;
reward rewarding the reasoning module with a reward of one when a node corresponding to an observed answer is reached; or
reward rewarding a reasoning module with the reward identified by a reward shaping network when a node not corresponding to the observed answer is reached, wherein the reward shaping network is a pre-trained neural network that generates the reward having a value between zero and one; and
traverse traversing from the current node to a next node at a next step in the plurality of time steps.

9. The system of claim 8, wherein the processor is further configured to generate the reward using a function:

$$R(s_T)=R_b(s_T)+(1-R_b(s_T))f(e_s,r_q,e_T)$$

wherein $s_T$ is a state at a target entity of a third node in the knowledge graph, $e_s$ is a start entity of the current node, $r_q$ is a relation of a query received by the policy network, $e_T$ is a target entity of the node corresponding to the observed answer, function $f$ is a composition function over entities in the knowledge graph, and $R_b(S_T)$ is a function determining a reward value.

10. The system of claim 8, wherein the mask is based on a Bernoulli distribution.

11. The system of claim 8, wherein the policy network uses a REINFORCE algorithm.

12. The system of claim 8, wherein the policy network is further configured to:
receive a query; and
generate, using the reasoning module, the observed answer in response to the query.

13. The system of claim 8, wherein the knowledge graph is an incomplete knowledge graph.

14. The system of claim 8, wherein the policy network is further configured to generate a set of answers in response to receiving a second query after the policy network is trained.

15. A non-transitory machine-readable medium having stored thereon machine-readable instructions executable to cause a machine to perform operations comprising:
training a policy network to search relational paths in an incomplete knowledge graph, the training including:
receiving a query;
traversing nodes of the incomplete knowledge graph over a plurality of time steps;
identifying, at a current time step in the plurality of time steps and using a reasoning module, a plurality of first outgoing links from a starting node in the incomplete knowledge graph, the reasoning module trained using a reward shaping network to reward the reasoning module using a reward having values only between zero and one;
masking, using the reasoning module at the current time step in the plurality of time steps, a subset of links from the plurality of first outgoing links of a current node to form a plurality of second outgoing links to a subset of nodes adjacent to the start node; or
traversing the incomplete knowledge graph using the plurality of second outgoing links to the subset of nodes until an observed answer is identified or is not found, wherein the traversing causes the reward shaping module to generate rewards with values indicating a likelihood the observed answer is reachable from the second outgoing links; and
traversing from the current node to a next node at a next step in the plurality of time steps.

16. The non-transitory machine-readable medium of claim 15, wherein the operations further comprise:
rewarding the reasoning module with the reward of one when a node corresponding to the observed answer is reached.

17. The non-transitory machine-readable medium of claim 16, wherein the operations further comprise generating the reward using a function:

$$R(s_T)=R_b(s_T)+(1-R_b(s_T))f(e_s,r_q,e_T)$$

wherein $s_T$ is a state at a target entity of a third node in the knowledge graph, $e_s$ is a start entity of the starting node, $r_q$ is a relation of the query received by the policy network, $e_T$ is a target entity of the node corresponding to the observed answer, function $f$ is a composition function over entities in the knowledge graph, and $R_b$ ($S_T$) is a function determining a reward value.

18. The method of claim 1, further comprising:
wherein the masking randomly masks the one or more links from the plurality of first outgoing links.

19. The method of claim 1, further comprising:
training the policy network over multiple iterations.

20. The method of claim 19, further comprising:
maximizing a reward of the policy network over the multiple iterations, wherein the reward is a combination of rewards determined over multiple iterations.

* * * * *